United States Patent
Guionnet (10) Patent No.: US 11,323,761 B2
(45) Date of Patent: May 3, 2022

(54) METHOD FOR SELECTING ENCODING PROFILES FOR MULTIMEDIA CONTENT FOR ON-DEMAND DISTRIBUTION

(71) Applicant: ATEME, Velizy Villacoublay (FR)

(72) Inventor: Thomas Guionnet, Rennes (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/280,459

(22) Filed: Feb. 20, 2019

(65) Prior Publication Data

US 2019/0281337 A1 Sep. 12, 2019

(30) Foreign Application Priority Data

Mar. 12, 2018 (FR) ...................... 18 52131

(51) Int. Cl.
*H04N 21/238* (2011.01)
*H04N 21/2343* (2011.01)
*H04N 21/2662* (2011.01)
*G06F 21/60* (2013.01)

(52) U.S. Cl.
CPC ....... *H04N 21/2662* (2013.01); *G06F 21/606* (2013.01); *H04N 21/238* (2013.01); *H04N 21/23439* (2013.01)

(58) Field of Classification Search
CPC ......... H04N 21/2662; H04N 21/23439; H04N 21/238
See application file for complete search history.

(56) References Cited

U.S. PATENT DOCUMENTS

| 2015/0074232 | A1 | 3/2015 | Phillips et al. |
| 2016/0295216 | A1* | 10/2016 | Aaron ............... H04N 21/23439 |
| 2016/0353138 | A1* | 12/2016 | Bennington ..... H04N 21/23439 |
| 2018/0160161 | A1* | 6/2018 | Reznik ............... H04N 21/8456 |
| 2019/0028745 | A1* | 1/2019 | Katsavounidis ....... H04N 19/59 |

FOREIGN PATENT DOCUMENTS

WO 2016/022769 A1 2/2016

OTHER PUBLICATIONS

Search Report issued in related application FR 18 52131, dated Oct. 17, 2018, 8 pages.

* cited by examiner

*Primary Examiner* — Hsiungfei Peng
(74) *Attorney, Agent, or Firm* — Faegre Drinker Biddle & Reath LLP (57) ABSTRACT

A method, implemented by computer means, for digitally encoding multimedia content into one or more video streams for on-demand distribution to at least one receiving terminal, the method comprising the following steps: from a given set of profiles, each profile being characterized by a value of at least one encoding parameter, forming one or more ordered groups of profiles, it being possible for a same profile to be present in multiple groups, such that in each group, each profile and its immediate successor satisfy a first predetermined condition, and selecting from the formed groups at least one group of profiles satisfying a second predetermined condition.

20 Claims, 6 Drawing Sheets

METHOD FOR SELECTING ENCODING PROFILES FOR MULTIMEDIA CONTENT FOR ON-DEMAND DISTRIBUTION

CROSS-REFERENCE TO RELATED APPLICATION

This application claims priority benefit under 35 U.S.C. § 119(d) from French Patent Application No. 18 52131, filed Mar. 12, 2018, the disclosure of which is incorporated by reference herein in its entirety.

FIELD

The disclosure relates to the selection of encoding profiles, or compression profiles, for encoding multimedia content for on-demand distribution to at least one receiving terminal.

BACKGROUND

In recent years, the distribution of digital television has undergone multiple changes. New audiovisual services such as video-on-demand (VOD) or catch-up TV have developed and have led to the development of network infrastructures offering greater bandwidth in order to facilitate the providing of such services in addition to traditional television distribution (Broadcast).

This evolution has led to the creation of a new type of service, called OTT (Over-The-Top) or bypass services, providing multi-screen delivery of multimedia content (video and audio in particular) on the Internet. The involvement of a traditional network operator in controlling content distribution is superfluous to the function of OTT services. OTT services are therefore provided through what are called unmanaged networks, meaning networks whose quality of service (QoS) or bandwidth varies for each customer and varies over time.

OTT services are provided point-to-point, with each client having its own connection for downloading multimedia content. Also, as the number of clients increases, the bandwidth consumed also increases which leads to overloading the equipment upstream of the OTT service providers and also to overloading the distribution networks downstream, all the way to the end user.

This overload is accentuated by the multiplicity of distribution formats for multimedia content, which require OTT service providers to maintain and manage multiple versions of the same content in different formats.

This multiplicity of formats, also called profiles, is due to the diversity in the possible distribution conditions for multimedia content. Thus, the hardware constraints, the available bandwidth, and the state of the connection for downloading and distributing the multimedia content are all parameters which vary from one client to another, explaining the need for providing multiple profiles for the same multimedia content.

Another reason for the need to keep a large number of profiles available is the requirement for a transition between two adjacent profiles that is as smooth and imperceptible as possible. In fact, the distribution conditions can definitely change during streaming for the same user, deteriorating or improving, so that the streaming player can switch from one profile to another in order to adapt to changing conditions. For example, if the client's connection improves while streaming, the streaming player will be able to switch to a profile of higher quality.

However, when there are too many profiles the issues of storage and bandwidth arise. In fact, for each existing profile, the OTT service provider is forced to store the version of the multimedia content corresponding to the profile in question.

The embodiments disclosed therein improve the situation.

SUMMARY

A method is proposed, which is implemented by computer means, for digitally encoding multimedia content into one or more video streams for on-demand distribution to at least one receiving terminal. The method comprises the following steps:

from a given set of profiles, each profile being characterized by a value of at least one encoding parameter, forming one or more ordered groups of profiles, it being possible for a same profile to be present in multiple groups, such that in each group, each profile and its immediate successor satisfy a first predetermined condition, and selecting from the formed groups at least one group of profiles satisfying a second predetermined condition.

The method for selecting at least one group of profiles makes it possible to propose different levels of quality for the encoding of the multimedia content. Subsequently, during distribution of the multimedia content, it is then possible to switch from one profile to another as the conditions for distributing the multimedia content change. This flexibility is made possible by forming the groups of profiles according to the first predetermined condition and by selecting one or more of these groups of profiles according to the second predetermined condition.

According to one aspect of the disclosure, the first predetermined condition relates to a continuity between each profile and its immediate successor, this continuity concerning respective encoding parameter values of the profile and the immediate successor.

As explained above, the forming and then the selection of one or more groups of profiles makes it possible, when distributing the multimedia content, to be able to change from one profile to another and thus from one quality level to another. It is also advantageous to have a transition from one profile to another that is almost imperceptible. This smoother transition is achieved by the application of a first predetermined condition relating to a continuity between each profile and its immediate successor. Indeed, to improve the experience of a user viewing the multimedia content, it is necessary that the transition from one profile to another be as imperceptible as possible. This imperceptibility is also linked to the values of the different encoding parameters of each profile.

According to one aspect of the disclosure, the step of forming one or more groups of profiles is implemented such that, in each formed group of profiles, each profile necessarily has a predecessor and a successor except in a case of impossibility related to the first predetermined condition.

Such an embodiment makes it possible to form more complete groups of profiles and in particular groups of profiles comprising a certain number of profiles. Indeed, the conditions for distributing the multimedia content may vary over time for the same receiving terminal and it is therefore sometimes necessary to transition regularly from one profile to another.

In one or more embodiments, the step of forming one or more ordered groups of profiles comprises:

constructing a directed graph comprising a set of nodes and a set of arcs such that each node corresponds to a profile in the set of profiles, and such that a first node is connected to a second node by an arc, the arc in question having the first node as its origin and the second node as its end point, if and only if the profiles respectively associated with the first and second nodes satisfy the first predetermined condition, selecting one or more paths of said directed graph such that each path comprises a node of zero outdegree, and forming one or more ordered groups of profiles, each group corresponding to a selected path, such that a profile and its successor respectively correspond to a first node and a second node connected by an arc.

The use of a directed graph is particularly helpful when forming groups of profiles, particularly for reasons of completeness. In addition, graph optimization methods are well known and are well suited for the case where the nodes of the directed graph are profiles. In addition, the directed graph may also be useful when applying the second predetermined condition and therefore when selecting paths in the directed graph.

According to one aspect of the disclosure, a profile is characterized by two encoding parameter values: a resolution and a video bitrate.

Defining a profile by a resolution and a video bitrate makes it possible to obtain a large diversity of potential profiles by varying the resolution on the one hand and the video bitrate on the other hand.

According to another aspect of the disclosure, a distortion value is associated with each pair of values for the resolution and video bitrate, the distortion being representative of a video quality obtained after encoding the multimedia content according to the profile characterized by these values for the resolution and video bitrate into a video stream and decoding said video stream.

The concept of "distortion" makes it possible to characterize the video quality of an encoding profile. Distortion characterizes the quality of the reconstruction of a compressed image, here an image from the video stream after encoding then decoding, compared to the original image, here the corresponding image in the multimedia content.

In one or more embodiments, the step of forming one or more ordered groups of profiles is preceded by a filtering step comprising:

ordering the profiles of the set of profiles by descending order of resolution, such that if one or more profiles have the same resolution, these profiles are ordered by descending order of bitrate and/or by increasing order of distortion, and if, after ordering, a first profile precedes a second profile such that the second profile has a video bitrate higher than the first profile or a distortion lower than the first profile, deleting the second profile in question from the set of profiles.

This filtering step makes it possible to avoid errors upstream of the selection of at least one group of profiles. Typically, for a given video bitrate, when the resolution decreases, the quality decreases and therefore the distortion increases. Similarly, for a given resolution, when the video bitrate decreases the distortion increases. This step therefore involves deleting the inconsistent profiles, meaning the profiles that do not satisfy the rules stated above.

In one or more embodiments, the satisfying of the first predetermined condition by a profile and its immediate successor in a group of profiles at least implies that the resolution of said successor is less than or equal to the resolution of said profile, that the video bitrate of said successor is less than or equal to the video bitrate of said profile, and that the distortion of said successor is greater than or equal to the distortion of said profile.

In one or more embodiments, each profile is characterized at least by a video bitrate, and the satisfying of the first predetermined condition by a profile and its immediate successor in a group of profiles at least implies that the ratio of the video bitrate of said profile and of the video bitrate of said successor is greater than or equal to a minimum video bitrate threshold and is less than or equal to a maximum video bitrate threshold.

As explained above, when distributing multimedia content it is necessary to enable changing from one encoding profile to another in order to adapt to network-related distribution conditions. Satisfying the first predetermined condition facilitates a consistent transition from one profile to another at the time of distribution.

In one or more embodiments, a video quality obtained after encoding the multimedia content into a video stream according to a given profile and decoding said video stream is characterized by a distortion, and the satisfying of the first predetermined condition by a profile and its immediate successor in a group of profiles at least implies that the ratio of the distortion of said profile and the distortion of said successor is greater than or equal to a minimum distortion ratio threshold and is less than or equal to a maximum distortion ratio threshold.

Here again, such an embodiment makes it possible to ensure that the formed group of profiles that is suitable for being selected will be such that a smooth transition is possible during distribution of the multimedia content when changing from one profile of a certain video quality to another profile of a different video quality. The display of the multimedia content via the receiving terminal will then, as a result of the evolving streaming conditions, switch from one profile to another.

In one or more embodiments, the satisfying of the second predetermined condition by a group of profiles at least implies that the group of profiles in question comprises at least one profile characterized by a parameter value satisfying a threshold constraint on said parameter.

According to one aspect of the disclosure:

the at least one profile is characterized by a resolution, and the satisfying of the threshold constraint by the at least one profile implies that the resolution of the at least one profile is greater than or equal to a predetermined minimum resolution, and/or the at least one profile is characterized by a resolution, and the satisfying of the threshold constraint by the at least one profile implies that the resolution of the at least one profile is less than or equal to a predetermined maximum resolution, and/or the at least one profile is characterized by a video bitrate, and the satisfying of the threshold constraint by the at least one profile implies that the video bitrate of the at least one profile is greater than or equal to a predetermined minimum bitrate; and/or the at least one profile is characterized by a video bitrate, and the satisfying of the threshold constraint by the at least one profile implies that the video bitrate of the at least one profile is less than or equal to a predetermined maximum bitrate.

It is advantageous if the panel of encoding profiles for the multimedia content to be distributed makes it possible to satisfy quality constraints. For example, when the conditions of the network so allow, the user of the receiving terminal displaying the multimedia content must be able to have access to the best quality, therefore to a resolution greater than a minimum resolution, or else to a video bitrate greater than a minimum video bitrate. Conversely, the available group of profiles must also be suitable for possible poorer distribution conditions. In order for the user to have access to the multimedia content even when the user cannot be provided an optimum quality, it may be necessary for the group of profiles to comprise at least one profile with a resolution below a maximum resolution, or with a video bitrate below a maximum video bitrate.

In one or more embodiments, the satisfying of the second predetermined condition by a group of profiles at least implies that the group of profiles in question makes it possible to minimize a total parameter value of the profiles of said group of profiles.

According to one aspect of the disclosure, the total parameter value to be minimized is a video bitrate.

As explained above, one can apply the second predetermined condition to ensure that a selected group of profiles provides at least one profile of high quality, used in cases where the distribution conditions are optimal, and/or at least one profile of low quality, used in cases where the distribution conditions are lower or even poor. This second predetermined condition may further concern all profiles in the group of profiles, in order to satisfy a general quality requirement.

In one or more embodiments, a video quality obtained after encoding the multimedia content into a video stream according to a given profile and decoding said video stream is characterized by a distortion, and the satisfying of the second predetermined condition by a group of profiles at least implies that the group of profiles in question makes it possible to minimize a total distortion of the profiles of said group of profiles.

Distortion allows characterizing the quality of an encoding profile. A second predetermined condition relating at least directly to distortion and not to the resolution or video bitrate makes it possible to satisfy quality requirements for the providing of profiles during distribution of the multimedia content.

In one or more embodiments, the second predetermined condition relates at least to a number of profiles comprised in the at least one group of profiles to be selected.

As explained above, the variation in distribution conditions for the multimedia content requires, in return, a diversity and heterogeneity of the proposed profiles. These requirements necessarily imply constraints regarding the number of profiles proposed. For example, the at least one selected group of profiles must have a minimum number of profiles. Conversely, too large a number of profiles makes storage difficult and is not viable. It may therefore appear necessary to limit the number of profiles of the at least one selected group of profiles to a maximum number of profiles.

According to one aspect of the disclosure, the step of forming one or more groups of profiles is preceded by the following steps:
  analyzing a video quality obtained after encoding the multimedia content into a video stream and then decoding said video stream, these encoding and decoding operations being repeated for different values of at least one encoding parameter, and
  generating a set of profiles according to the video quality analysis, each profile being characterized by a value of the at least one encoding parameter.

In this embodiment, the profiles transmitted in order to implement the formation of the groups of profiles were first selected by testing the video quality of a large number of profiles. This step allows a fairly reliable selection of "candidate" profiles, since the video quality of each profile was measured after encoding the multimedia content according to the profile in question, then decoding.

According to another aspect of the disclosure, the step of selecting at least one group of profiles is followed by a step of encoding the multimedia content into one or more video streams, each video stream being obtained by encoding said multimedia content according to a profile from the at least one selected group of profiles.

It is advantageous to implement a step of actually encoding the multimedia content according to the different profiles of the at least one selected group of profiles, in order to be able to then make the obtained video streams available to a user of a receiving terminal wishing to access the multimedia content.

As previously explained, the different profiles and the video streams obtained by encoding the multimedia content according to the different profiles allow a certain flexibility, the receiving terminal being able to change from one video stream to another, and therefore from one profile to another, depending on the distribution conditions. In addition, the first predetermined condition makes it possible to order the profiles within a group of profiles so that, when the distribution conditions change, the transition from one video stream to another is made according to the order of the corresponding profiles. For example, if the distribution conditions improve, the receiving terminal displaying the multimedia content M changes from one profile to a preceding profile (typically the immediate predecessor). Conversely, if the distribution conditions deteriorate, the receiving terminal changes from one profile to a subsequent profile (typically the immediate successor).

The disclosure further relates to a computer program comprising instructions for implementing the method described above, when these instructions are executed by at least one processor.

The disclosure also relates to a system, comprising a module for selecting at least one group of profiles for encoding a multimedia content, each profile being characterized by a value of at least one encoding parameter, in order to digitally encode the multimedia content into one or more video streams for on-demand distribution to at least one receiving terminal. "A value of at least one encoding parameter" is understood here by the skilled person to mean that each profile can be characterized by one or more values, and that each value corresponds to an encoding parameter distinct from the other encoding parameters. For example, a profile is characterized by a first value of a first encoding parameter and a second value of a second encoding parameter. The selection module is arranged to form, from a given set of profiles, one or more ordered groups of profiles, it being possible for a same profile to be present in multiple groups, such that in each group, each profile and its immediate successor satisfy a first predetermined condition. The selection module is further arranged to select from the formed groups at least one group of profiles satisfying a second predetermined condition.

In one or more embodiments, the system further comprises an analysis module arranged to analyze a video quality obtained after encoding the multimedia content into a video stream and then decoding said video stream, these encoding and decoding operations being repeated for different values of at least one encoding parameter. The analysis module is further arranged to generate a set of profiles, each profile being characterized by a value of the at least one encoding parameter.

In one or more embodiments, the system further comprises an encoding module arranged to encode the multimedia content into one or more video streams, each video stream being obtained by encoding said multimedia content according to a profile from the at least one group of profiles that is selected by the selection module.

BRIEF DESCRIPTION OF THE DRAWINGS

Other features, details, and advantages will be apparent from reading the following detailed description, and from an analysis of the appended drawings, in which.

DETAILED DESCRIPTION

Figure 1:
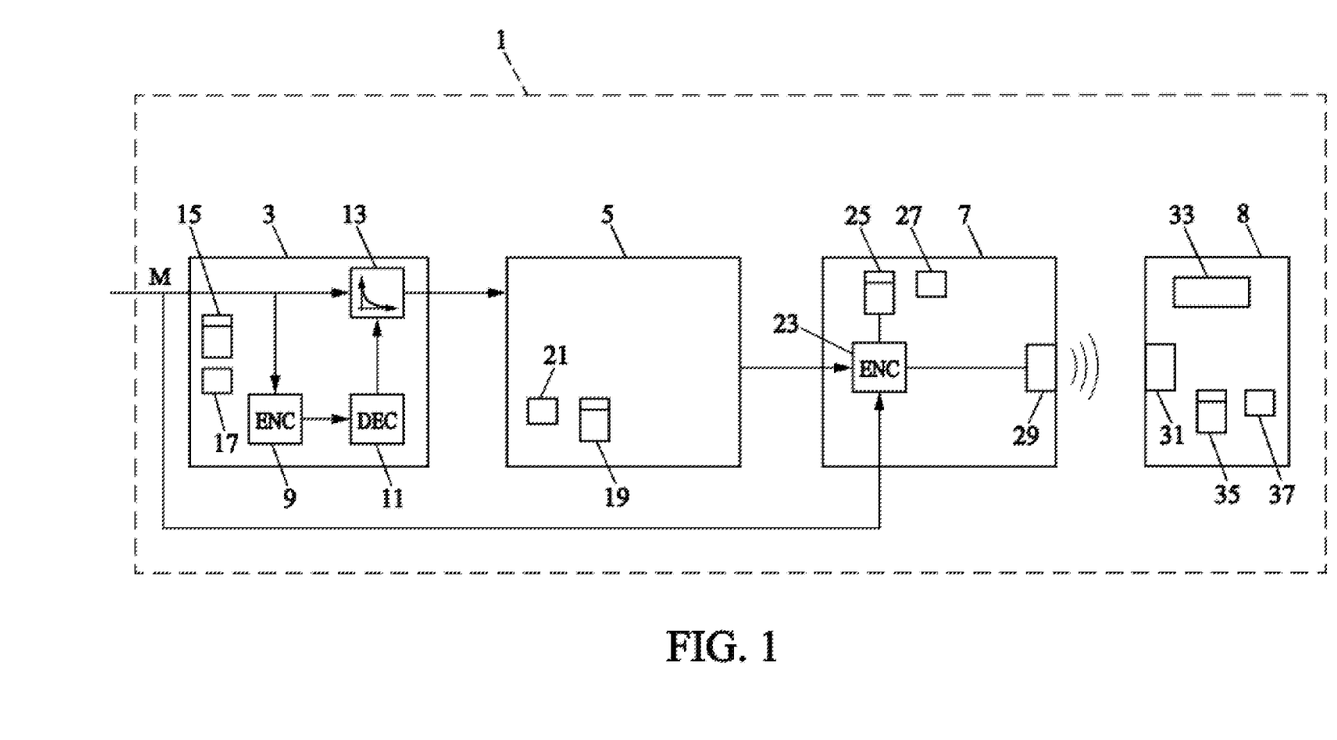
FIG. 1 illustrates a system according to an embodiment, comprising an analysis module, a module for selecting at least one group of profiles, and an encoding module.

FIG. 1 illustrates a system 1. The system 1 is adapted for digitally encoding multimedia content M into one or more video streams for the purposes of on-demand distribution to at least one receiving terminal.

"Digitally encoding" is understood here to mean that an obtained video stream is a stream compressed according to a given compression standard. These compression standards designate existing standards known to those skilled in the art. By way of example only, these standards are standards such as H.265, also called MPEG-HEVC (acronym for "High Efficiency Video Coding"), and H.264 also called MPEG-4 AVC (acronym for "Advanced Video Coding"). Other compression standards are possible, of course. Multiple encoding profiles, or compression profiles, can be defined for each compression standard. In the remainder of the description, the more simple term "profile" will be used. Each profile is characterized by at least one encoding parameter value. For example, a profile is characterized by two encoding parameter values: a resolution and a video bitrate. It is thus understood that in the context of the disclosure, a profile designates a type of encoding and not the video stream resulting from encoding the multimedia content according to the profile in question.

It is therefore understood that the system 1 is suitable for digitally encoding the multimedia content M according to different profiles, each profile corresponding to a compression standard characterized, for example, by a resolution and a video bitrate. The diversity of the profiles offered allows OTT (Over-The-Top) distribution to different receiving terminals, knowing that the conditions for downloading and distributing multimedia content M are variable from one receiving terminal to another, hence the need to offer multiple versions of the same multimedia content, each version corresponding to a video stream compressed according to a specific profile.

The system 1 comprises an analysis module 3, a selection module 5, and an encoding module 7. As an example, the system further comprises at least one receiving terminal 8.

The analysis module 3 is arranged to generate a set of profiles for encoding the multimedia content M. As explained above, a profile is for example characterized by a resolution and a video bitrate. In such an embodiment, the analysis module 3 is therefore arranged to generate a set of resolution-video bitrate pairs, each corresponding to an encoding profile.

The analysis module 3 comprises an encoding sub-module 9, a decoding sub-module 11, a video quality analysis sub-module 13, a memory 15, and a processor 17.

The encoding sub-module 9 is arranged to digitally encode the multimedia content M into one or more video streams, each video stream corresponding to a profile whose encoding parameter values are determined by the encoding sub-module 9.

The principle of the encoding sub-module 9 is to encode the multimedia content M according to a large number of profiles, by varying the value of at least one encoding parameter. Advantageously, the encoding sub-module 9 is arranged to encode the multimedia content M for different resolution-video bitrate pairs, each pair making it possible to obtain a video stream which therefore corresponds to a compressed stream. As an example, the encoding sub-module 9 is arranged to encode the multimedia content M at least according to the following resolutions: 1920*1080, 1280*720, 1024*576, 832*468, 768*432, and 640*360. Still as an example, the encoding sub-module is arranged to encode the multimedia content M at video bitrates between 356 kbps (kilobits per second) and 2955 kbps. As explained below, the video streams compressed according to several different profiles are intended to be analyzed.

The decoding sub-module 11 is arranged to digitally decode the video stream or streams generated by the encoding sub-module 9. It is understood that for each video stream generated by the encoding sub-module 9 according to a given profile, the video stream in question is decoded by the decoding sub-module 11.

"Digitally decoding" is understood here to mean that each video stream output from the decoding sub-module 11 is an uncompressed stream.

The analysis sub-module 13 is arranged to analyze a video quality of each video stream decoded by the decoding sub-module 11. As illustrated in FIG. 1, the analysis sub-module 13 also takes the multimedia content as input M. Thus, the analysis sub-module 13 is arranged to compare the multimedia content M to each of the video streams obtained after encoding and then decoding the multimedia content M, and thus to determine the video quality of each video stream and therefore of each profile tested.

In the remainder of the description, the concept of "distortion" will be used to characterize this video quality. Distortion makes it possible to characterize the quality of reconstruction of a compressed image, here an image from the video stream after encoding then decoding, in comparison to an original image, here the corresponding image in the multimedia content M. The analysis sub-module 13 is arranged to measure the distortion of each video stream, and therefore the distortion associated with each profile tested.

The metric for measuring distortion is for example the PSNR (acronym for "Peak Signal to Noise Ratio"). The PSNR can be defined as follows:

$$PSNR = 10 \cdot \log_{10}\left(\frac{d^2}{MSE}\right)$$

where:

d is a dynamic of the video stream after encoding then decoding, meaning the maximum possible value for a pixel of an image of the video stream in question, and MSE is the mean squared error defined as follows for an original image $I_o$ of the multimedia content M and a compressed image $I_c$ of the video stream, each image being an array of m*n pixels:

$$MSE = \frac{1}{mn}\sum_{i=0}^{m-1}\sum_{j=0}^{n-1}(I_o(i,j) - I_c(i,j))^2$$

where:

$I_o(i, j)$ is the value of the pixel of the i-th row and the j-th column of the original image $I_o$, and $I_c(i, j)$ is the value of the pixel of the i-th row and the j-th column of the compressed image $I_c$.

It is well known to those skilled in the art that, for the PNSR calculation, it is conventional to add a strictly positive real value E to the mean squared error. The addition of such a value makes it possible, for example, to be able to calculate a value of PSNR even when the mean squared error is zero.

The PSNR can be expressed without units or in decibels (dB).

As previously explained, each video stream is compressed according to a profile characterized by a value of at least one encoding parameter, for example a resolution and a video bitrate, and then decompressed. It is thus clear that, for each resolution-video bitrate pair, the analysis sub-module 13 is arranged to determine a distortion on the basis of a comparison between the video stream encoded by the encoding sub-module 9 according to the profile corresponding to the resolution-video bitrate pair in question then decoded by the decoding sub-module 11, and the multimedia content M.

Figure 2:
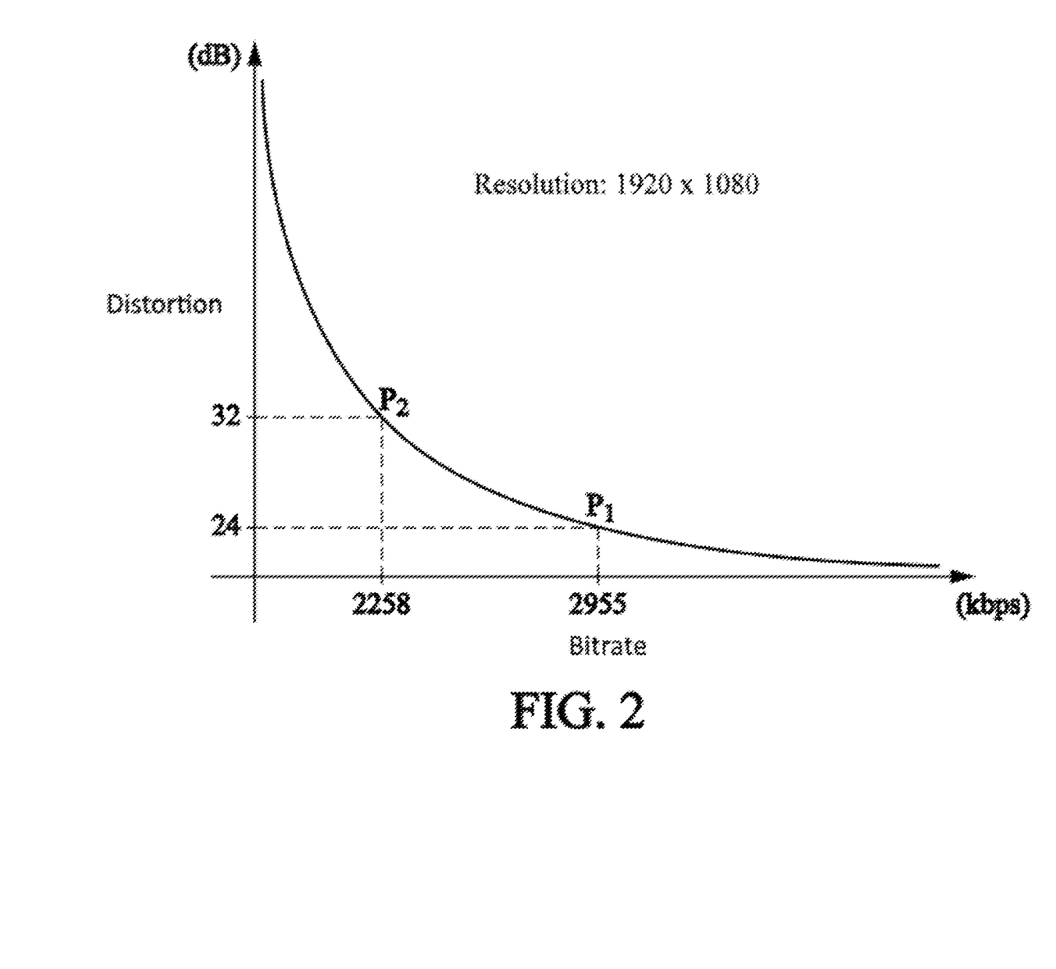
FIG. 2 illustrates a bitrate-distortion curve obtained by the analysis module, for a resolution of 1920*1080.

FIG. 2 illustrates, as an example, a bitrate-distortion curve obtained for a resolution of 1920*1080. In other words, each point of the curve allows determining the distortion obtained for a given video bitrate and a resolution of 1920*1080. It is understood that, advantageously, the analysis sub-module 13 is arranged to plot such a curve for each possible resolution.

The analysis sub-module 13 is also arranged to generate a set of profiles, each profile being characterized by a value of the at least one encoding parameter, on the basis of the analysis performed. For example, here the analysis sub-module 13 is arranged to generate a set of profiles, each profile being characterized by a resolution-video bitrate for which the measurement of the distortion by the analysis sub-module 13 is considered satisfactory.

The memory 15 is configured to store instructions in the form of a computer program which when executed by the processor 17 results in the operation of the analysis module 3. Advantageously, the memory 15 is further configured to store the set of profiles that is generated by the analysis sub-module 13.

The selection module 5 is arranged to form, from a given set of profiles, one or more ordered groups of profiles, the same profile able to be present in multiple groups, such that in each group, each profile and its immediate successor satisfy a first predetermined condition. For example, the given set of profiles is the set generated by the analysis module 3.

In one or more embodiments, the first predetermined condition concerns a continuity between each profile and its immediate successor. As explained below, this continuity between profiles makes it possible, during distribution of the multimedia content M, to switch from one video stream to another, each video stream corresponding to the encoding of the multimedia content M according to a profile, on the basis of changes in the distribution conditions. Moreover, this continuity concerns respective encoding parameter values of the profile and the immediate successor. In other words, this continuity between a profile and its immediate successor (or its immediate predecessor for that matter) relates to the encoding parameter value(s) characterizing these profiles.

The selection module 5 is further arranged to select from the formed groups at least one group of profiles satisfying a second predetermined condition. The formation of the ordered groups of profiles as well as the selection of at least one group of profiles from the formed groups will be described in more detail below with reference to FIGS. 3, 4, 5, 6A and 6B.

Advantageously, the selection module 5 is further arranged to filter the set of profiles before forming the ordered groups of profiles. Here again, the filtering of the set of profiles will be described in more detail in the rest of the description.

The selection module 5 comprises a memory 19 and a processor 21.

The memory 19 is configured to store instructions in the form of a computer program which when executed by the processor 21 results in the operation of the selection module 5.

The memory 19 can also be configured to store the set of profiles received by the selection module 5. The memory 19 may also store the group or groups of profiles selected by the selection module 5.

The encoding module 7 is arranged to encode the multimedia content M into one or more video streams, each video stream being obtained by encoding the multimedia content M according to a profile of the group or groups of profiles selected by the selection module 5.

The encoding module 7 comprises an encoding sub-module 23, a memory 25, and a processor 27. Advantageously, the encoding module 7 further comprises a communication sub-module 29.

The encoding sub-module 23 is arranged to encode the multimedia content M into one or more video streams. As illustrated in FIG. 1, the encoding sub-module 23 has as inputs both the group or groups of profiles selected by the selection module 5 and the multimedia content M. It is understood that the encoding sub-module 23 is arranged to generate as many video streams as there are profiles in the group or groups of selected profiles. Each video stream generated by the encoding sub-module 23 is a stream compressed according to a profile characterized by at least one value of an encoding parameter, for example a resolution and a video bitrate. The encoding sub-module 23 may be similar to the encoding sub-module 9 of the analysis module 3 described above.

The memory 25 is configured to store instructions in the form of a computer program which when executed by the processor 27 results in the operation of the encoding module 7. Advantageously, the memory 25 is further configured to store the video stream or streams generated by the encoding sub-module 23.

As illustrated in FIG. 1, the encoding module 7 further comprises a communication sub-module 29. The communication sub-module 29 is arranged, for example, to send a video stream generated by the encoding sub-module 23 to a receiving terminal, for example the receiving terminal 8 described below, in order to display the video stream in question.

The receiving terminal 8 is arranged to display the multimedia content M. More precisely, the receiving terminal 8 is arranged to display the encoded multimedia content on the basis of the video stream or streams received during distribution, so that a change in the distribution conditions of the multimedia content M involves a transition from one video stream to another according to the order of the profiles within the selected group of profiles. The receiving terminal 8 is arranged to apply digital processing to the received video streams in order to display the multimedia content M.

The receiving terminal 8 comprises a communication module 31, a screen 33, a memory 35, and a processor 37.

The communication module 31 is arranged to receive the video stream or streams obtained by encoding the multimedia content M, coming from the encoding module 7, and more particularly from the communication sub-module 29.

The screen 33 is arranged to display the multimedia content M.

The memory 35 is configured to store instructions in the form of a computer program which when executed by the processor 37 results in the operation of the receiving terminal 8. In other words, the processor 37 controls the transition from one video stream to another, therefore from one profile to another, when changes in the distribution conditions make this transition necessary.

It is thus understood that the network conditions have an impact on the distribution of the video streams generated by the encoding module 7 to the receiving terminal 8, such that, depending on the distribution conditions, the latter can be induced to display the multimedia content M at one quality level rather than another.

As explained above, the context relates to so-called OTT services or bypass services. Such OTT services are provided through "unmanaged" networks, meaning networks whose quality of service (QoS) or bandwidth varies for each client and varies over time. Each client has its own connection for downloading the multimedia content, the downloading conditions varying from one client to another, which therefore requires saving and managing multiple versions of the multimedia content M, these versions corresponding to different profiles. Moreover, the downloading and distribution conditions may vary over time for the same client. The on-demand distribution of multimedia content M offering multiple video streams of a same multimedia content M is ultimately materialized by the possibility for the receiving terminal 8 to switch from one profile to another, depending on the distribution conditions for the video streams associated with these profiles. The display of the multimedia content M by the receiving terminal 8 is dictated by the distribution conditions of the video streams.

The switch from one video stream to another corresponds to the switch from one profile to another. This transition from one video stream to another is facilitated by the fact that the group or groups of profiles formed and then selected are ordered according to the first predetermined condition which, in one or more embodiments, relates to continuity between profiles. Those skilled in the art thus understand that this continuity dictating the order of the profiles within a group of profiles is linked to the later distribution of the multimedia content, the profiles being ordered according to their respective encoding parameter values.

Figure 3:
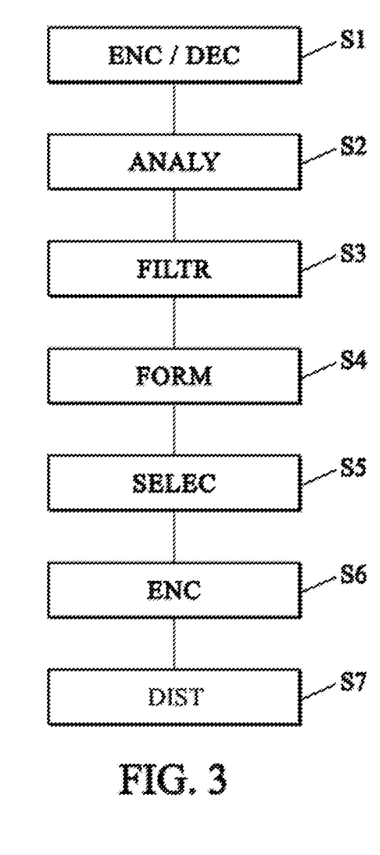
FIG. 3 illustrates a method according to an embodiment.

A method according to an embodiment will now be described with reference to FIG. 3.

In a first step S1, the multimedia content M is sent to the analysis module 3. The encoding sub-module 9 digitally encodes the multimedia content M into one or more video streams. Each video stream generated is a stream compressed according to a profile characterized by at least one encoding parameter value. As explained above, each profile is characterized for example by a resolution and a video bitrate.

The video streams are then sent to the decoding sub-module 11. The decoding sub-module 11 digitally decodes each of the video streams received. These video streams are thus decompressed when output from the decoding sub-module 11.

In a second step S2, the video quality of each uncompressed video stream output from the decoding sub-module 11 is estimated and analyzed by comparison with the multimedia content M. Advantageously, a bitrate-distortion curve is generated for each resolution. As an example, FIG. 2 illustrates a bitrate-distortion curve obtained for a resolution of 1920*1080, each point of the curve making it possible to determine the distortion obtained for a given video bitrate, indicated on the x-axis, and a resolution of 1920*1080.

On the basis of the analysis performed on each uncompressed video stream and the various bitrate-distortion curves plotted for each of the resolutions, the analysis sub-module 13 then generates a set of profiles.

For example, from the bitrate-distortion curve plotted for a resolution of 1920*1080 and illustrated in FIG. 2, two profiles $P_1$ and $P_2$ are selected by the analysis sub-module 13 for inclusion in the set of profiles. Profile $P_1$ is characterized by a resolution of 1920*1080 and a video bitrate of 2955 kbps. Profile $P_2$ is characterized by a resolution of 1920*1080 and a bitrate of 2258 kbps.

As an example, Table 1 below shows a set of profiles generated by the analysis sub-module 13. This set of profiles comprises profile $P_1$ and the second profile $P_2$, retained on the basis of the analysis performed by the analysis sub-module 13 for a resolution of 1920*1080:

TABLE 1

| Profiles | Resolution | Bitrate (kbps) | Distortion (dB) |
|---|---|---|---|
| $P_1$ | 1920*1080 | 2955 | 24 |
| $P_9$ | 768*432 | 491 | 79 |
| $P_3$ | 1280*720 | 1512 | 45 |
| $P_{11}$ | 640*360 | 356 | 88 |
| $P_5$ | 1024*576 | 1063 | 57 |
| $P_6$ | 1024*576 | 778 | 65 |
| $P_{10}$ | 640*360 | 488 | 80 |
| $P_2$ | 1920*1080 | 2258 | 32 |
| $P_4$ | 1280*720 | 1123 | 53 |
| $P_8$ | 768*432 | 670 | 71 |
| $P_7$ | 832*468 | 552 | 75 |

In Table 1, one can see that the profiles comprised in the set of profiles are of various resolutions. Indeed, even if the OTT service provider wishes to deliver the highest possible resolution, the conditions for downloading and distributing the multimedia content M do not always support a high resolution. In addition, it is sometimes better to decrease the resolution rather than the video bitrate. When the bitrate is lowered, the multimedia content M must be further compressed which can lead to the appearance of compression artifacts, hence the need to offer lower resolutions rather than to reduce the video bitrate while remaining at the maximum resolution.

The set of profiles generated by the analysis sub-module 13 is then transmitted to the selection module 5.

In a third step S3, the selection module 5 filters a set of received profiles. For example, the set of profiles filtered by the selection module 5 is the set of profiles generated by the analysis sub-module 13 during step S2 and illustrated in Table 1 above. During this step, the selection module 5 orders the profiles in the set of profiles by decreasing order of resolution such that, if one or more profiles have the same resolution, such profiles are ordered by decreasing order of bitrate and/or by increasing order of distortion. The set of profiles, after ordering, is illustrated in Table 2 below:

TABLE 2

| Profiles | Resolution | Bitrate (kbps) | Distortion (dB) |
|---|---|---|---|
| $P_1$ | 1920*1080 | 2955 | 24 |
| $P_2$ | 1920*1080 | 2258 | 32 |
| $P_3$ | 1280*720 | 1512 | 45 |
| $P_4$ | 1280*720 | 1123 | 53 |
| $P_5$ | 1024*576 | 1063 | 57 |
| $P_6$ | 1024*576 | 778 | 65 |
| $P_7$ | 832*468 | 552 | 75 |
| $P_8$ | 768*432 | 670 | 71 |
| $P_9$ | 768*432 | 491 | 79 |
| $P_{10}$ | 640*360 | 488 | 80 |
| $P_{11}$ | 640*360 | 356 | 88 |

Then, after ordering, if a first profile precedes a second profile such that the second profile has a video bitrate higher than the first profile or a distortion lower than the first profile, the selection module 5 deletes the second profile in question from the set of profiles. Such filtering makes it possible to avoid any anomalies. Indeed, and as illustrated in FIG. 2, the distortion is inversely proportional to the video bitrate.

In Table 2, profile $P_8$ has a video bitrate of 670 kbps which is therefore greater than the video bitrate of profile $P_7$ which is 552 kbps. However, one can see that the distortion of profile $P_8$ is 71 dB and is therefore less than the distortion of profile $P_7$ which is 75 dB. To correct this anomaly, the selection module 5 deletes one of the two profiles $P_7$ and $P_8$.

For example, the selection module 5 deletes the profile having the lowest resolution, which here is profile $P_8$.

The set of profiles after filtering, once this third step S3 is completed, is illustrated in Table 3 below:

TABLE 3

| Profiles | Resolution | Bitrate (kbps) | Distortion (dB) |
|---|---|---|---|
| $P_1$ | 1920*1080 | 2955 | 24 |
| $P_2$ | 1920*1080 | 2258 | 32 |
| $P_3$ | 1280*720 | 1512 | 45 |
| $P_4$ | 1280*720 | 1123 | 53 |
| $P_5$ | 1024*576 | 1063 | 57 |
| $P_6$ | 1024*576 | 778 | 65 |
| $P_7$ | 832*468 | 552 | 75 |
| $P_9$ | 768*432 | 491 | 79 |
| $P_{10}$ | 640*360 | 488 | 80 |
| $P_{11}$ | 640*360 | 356 | 88 |

During a fourth step S4, the selection module forms, from the set of profiles (for example the set of profiles after filtering), one or more ordered groups of profiles, it being possible for the same profile to be present in multiple groups, such that in each group, each profile and its immediate successor satisfy a first predetermined condition.

For example, the first predetermined condition relates to a continuity between each profile and its immediate successor, the continuity concerning respective encoding parameter values of the profile and the immediate successor.

As explained above, each profile is characterized for example by two encoding parameter values, namely a resolution and a video bitrate, a distortion being associated with the resolution-video bitrate pair.

In one or more embodiments, the satisfying of the first predetermined condition by a profile and its immediate successor in a group of profiles at least implies that the resolution of the successor is less than or equal to the resolution of the profile, that the video bitrate of the successor is less than or equal to the video bitrate of the profile, and that the distortion of the successor is greater than or equal to the distortion of the profile.

For example, the following groups of profiles can be formed:

TABLE 4

| Groups of profiles | Ordered profiles |
|---|---|
| $G_1$ | $P_1$, $P_3$, $P_6$, $P_{11}$ |
| $G_2$ | $P_5$, $P_{10}$ |
| $G_3$ | $P_6$, $P_7$, $P_{10}$ |

Of course, other groups of profiles satisfying such a first predetermined condition may be formed during this step.

In group $G_2$ for example, profile $P_5$ has profile $P_{10}$ as its immediate successor. Indeed, profile $P_{10}$ has a resolution of 640*360, therefore lower than the 1024*576 resolution of profile $P_5$, profile $P_{10}$ has a video bitrate of 488 kbps, therefore lower than the video bitrate of 1063 kbps of profile $P_5$, and profile $P_{10}$ has a distortion of 80 dB, therefore greater than the 57 dB distortion of profile $P_5$.

Moreover, it can be seen that profile $P_6$ is present in both group $G_1$ and in group $G_3$. Similarly, profile $P_{10}$ is present in both group $G_2$ and group $G_3$.

In one or more embodiments, the step of forming the one or more groups of profiles is implemented by the selection module 5 such that, in each group of profiles formed, each profile necessarily has a predecessor and a successor except in the case of an impossibility related to the first predetermined condition. With such a constraint, group $G_2$ cannot be formed. Indeed, profile $P_5$ has no predecessor while profiles $P_1$, $P_2$, $P_3$ and $P_4$ could indeed have profile $P_5$ for the immediate successor since $P_1$, $P_2$, $P_3$ or $P_4$ each satisfy, with $P_5$ as the immediate successor, the first predetermined condition as defined in the previous example. Moreover, profile $P_{10}$ has no immediate successor in group $G_2$ while profile $P_{11}$ could indeed be the immediate successor of $P_{10}$ since $P_{10}$ satisfies, with $P_{11}$ as the immediate successor, the first predetermined condition. Conversely, group $G_1$ meets this constraint. $P_1$ certainly has no predecessor, but no other profile could have $P_1$ as immediate successor while satisfying the first predetermined condition. Likewise, $P_{11}$ has no immediate successor since it is impossible to find another profile such that $P_{11}$ and that other profile as immediate successor to $P_{11}$ satisfy the first predetermined condition.

Figure 4:
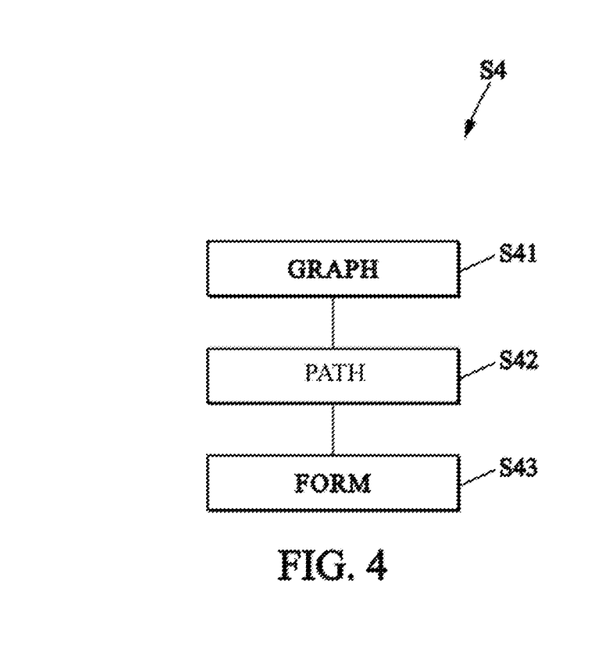
FIG. 4 illustrates a step of forming one or more groups of profiles in the method of FIG. 3, according to one embodiment.

An embodiment of step S4 will be described later on in the description, with reference to FIGS. 4 and 5.

In a fifth step S5, the selection module 5 selects from the formed groups at least one group of profiles satisfying a second predetermined condition.

For example, the satisfying of the second predetermined condition by a group of profiles at least implies that the group of profiles in question comprises at least one profile characterized by a parameter value satisfying a threshold constraint for this parameter.

In such case, many embodiments are possible and can obviously be combined with each other because of their compatibility. For example:

the at least one profile is characterized by a resolution, and the satisfying of the threshold constraint by the at least one profile implies that the resolution of the at least one profile is greater than or equal to a predetermined minimum resolution, and/or the at least one profile is characterized by a resolution, and the satisfying of the threshold constraint by the at least one profile implies that the resolution of the at least one profile is less than or equal to a predetermined maximum resolution, and/or the at least one profile is characterized by a video bitrate, and the satisfying of the threshold constraint by the at least one profile implies that the video bitrate of the at least one profile is greater than or equal to a predetermined minimum bitrate, and/or the at least one profile is characterized by a video bitrate, and the satisfying of the threshold constraint by the at least one profile implies that the video bitrate of the at least one profile is less than or equal to a predetermined maximum bitrate.

In the case where each profile is characterized at least by a resolution, the satisfying of the second predetermined condition by a group of profiles implies, for example, that the group of profiles in question comprises at least one profile characterized by a resolution greater than or equal to a predetermined minimum resolution. For example, the predetermined minimum resolution is the 1920*1080 resolution. In such an embodiment, and with reference to Table 4 illustrating groups formed by the selection module 5, only group $G_1$ is selected since it comprises profile $P_1$ characterized by a resolution of 1920*1080. Selecting a group comprising a profile characterized by a resolution greater than or equal to a predetermined minimum resolution makes it possible to ensure, during on-demand distribution, that a client can request and access the distribution of the multimedia content M at the highest resolution, if the hardware constraints and the distribution conditions allow it of course.

Alternatively or in parallel, the second predetermined condition relates to a number of profiles comprised in the group or groups of profiles to be selected.

This second predetermined condition on the number of profiles concerns, for example, a maximum number of profiles and/or a minimum number of profiles. For example, the group or groups of profiles selected by the selection module 5 must comprise at least three profiles. In such an embodiment, only groups $G_1$ and $G_3$ are selected since they respectively comprise four and three profiles. A minimum number of profiles in the selected group or groups of profiles ensures profile diversity during on-demand distribution. Indeed, the conditions for playing or downloading multimedia content M are variable and it is therefore advantageous for this heterogeneity of distribution conditions to be taken into account by a diversity of profiles and therefore of compressed video streams offered for the same multimedia content M.

Of course, it is understood that the second predetermined condition may be a combination of the above embodiments. In such case, only group $G_1$ is selected by the selection module 5.

In a sixth step S6, the selected group or groups of profiles are sent to the encoding module 7. The encoding sub-module 23 of the encoding module 7 receives as inputs both the at least one group of profiles selected by the selection module 5 and the multimedia content M, as illustrated in FIG. 1.

Also during this step, the encoding sub-module 7 encodes the multimedia content M into one or more video streams, each video stream being obtained by encoding the multimedia content M according to a profile from the at least one group of profiles selected by the selection module 5. The generated video stream or streams allow on-demand distribution, in the context of an OTT service in particular, each video stream having a different video quality. Advantageously, the video stream or streams are sent to at least one receiving terminal, in this case receiving terminal 8, by the communication sub-module 29.

Finally, during a seventh step S7, the receiving terminal 8 receives the video stream or streams coming from the encoding module 7. The receiving terminal 8 then has access to multiple versions of the same content, here the multimedia content M, and is thus ready to display this multimedia content M. The receiving terminal 8 applies digital processing to a video stream in order to display the multimedia content M, for example via the screen 33. When the distribution conditions change, the receiving terminal 8 adapts accordingly and changes the version of the multimedia content M. Thus, while viewing the multimedia content M, the distribution conditions for the multimedia content M, meaning the distribution of the video streams generated and representing multiple versions of the multimedia content M, may vary depending on the network or other factors such as the receiving terminal 8 itself, possible bad weather conditions, or more generally the traffic on the network through which the video streams are traveling. Therefore, and as previously explained, the receiving terminal 8, or a video player of this terminal, can switch from one video stream to another, therefore from one profile to another, in order to adapt to changing distribution conditions. Those skilled in the art will easily understand that the at least one selected group of profiles is ordered so that, when the receiving terminal switches from one profile to another profile, the other profile is advantageously the immediate predecessor or the immediate successor. In particular, when the distribution conditions improve, it will be natural for the receiving terminal to switch to a profile of better quality. Conversely, when the distribution conditions deteriorate, it will be natural for the receiving terminal to switch to a profile of lower quality. Of course, other causes may lead to the switch from one video stream to another. For example, the user of the receiving terminal 8 may sometimes change the quality, which results in a change of video stream and therefore of the profile.

An embodiment of step S4 of forming one or more groups of profiles will now be described with reference to FIGS. 4 and 5. In this embodiment, the term "steps" will be used, even if the steps in question may be considered as substeps of step S4. In addition, step S5 will also be described in the context of this specific embodiment with reference to FIGS. 6A and 6B.

In a step S41, the selection module 5 constructs a directed graph comprising a set of nodes and a set of arcs. The directed graph is constructed so that each node corresponds to a profile in the set of profiles received from the analysis module 3, and so that a first node is connected to a second node by an arc, the arc in question originating from the first node and ending at the second node, if and only if the profiles respectively associated with the first and second nodes satisfy the first predetermined condition. It will be understood that when an arc of the directed graph originates from a first node and ends at a second node, this means that the profile associated with the first node can have the profile associated with the second node as its successor in an ordered group.

It should be noted that such a directed graph representation makes it possible to exhaustively obtain the possible groups that can be formed by the selection module 5.

According to one or more embodiments, a video quality obtained after encoding the multimedia content into a video stream according to a given profile and decoding said video stream is characterized by a distortion, and the satisfying of the first predetermined condition by a profile and its immediate successor in a group of profiles at least implies that the ratio of the distortion of the profile and the distortion of the successor is greater than or equal to a minimum distortion ratio threshold and is less than or equal to a maximum distortion ratio threshold.

Of course, to ensure a smooth transition in video quality between two consecutive profiles of a same group of profiles, it is readily apparent to those skilled in the art that it is further possible in one or more embodiments to set, in the context of the first predetermined condition, a constraint on the difference in distortion between a profile and its immediate successor. For example, the satisfying of the first predetermined condition by a profile and its immediate successor in a group of profiles at least implies that the difference between the distortion of the successor and the distortion of the profile is greater than or equal to a minimum distortion difference threshold and is less than or equal to a maximum distortion difference threshold.

Typically, in such a case, the maximum difference threshold of the PSNR is 2 dB.

According to one or more embodiments, each profile is characterized by at least one video bitrate, and the satisfying of the first predetermined condition by a profile and its immediate successor in a group of profiles at least implies that the ratio of the video bitrate of the profile and of the video bitrate of the successor is greater than or equal to a minimum video bitrate threshold and is less than or equal to a maximum video bitrate threshold.

Figure 5:
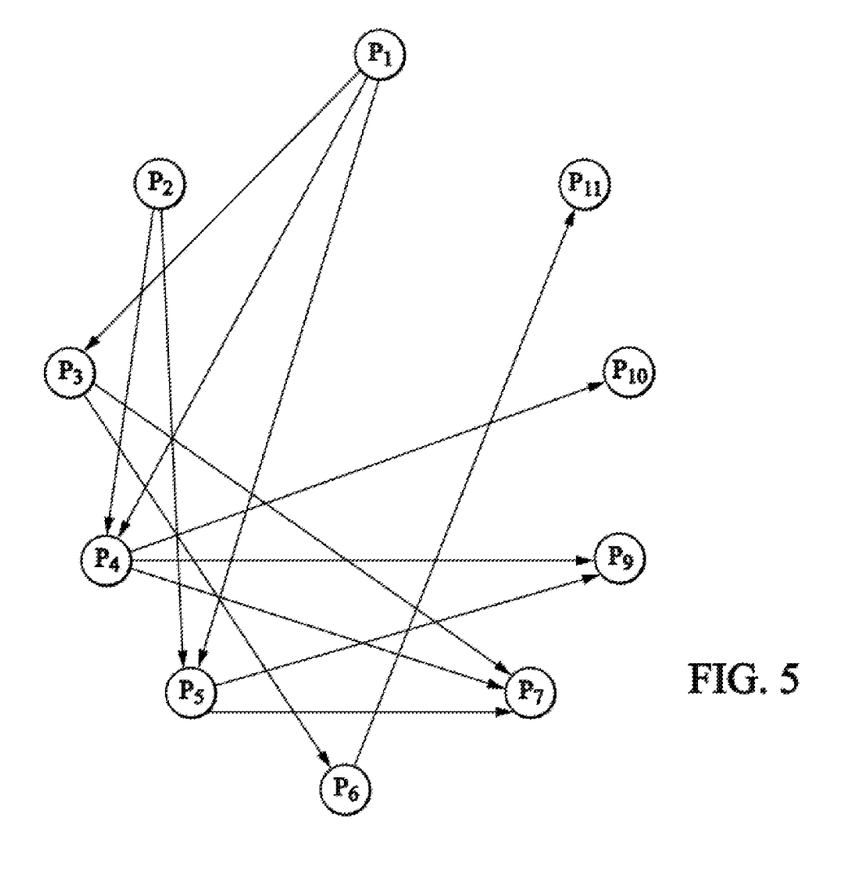
FIG. 5 illustrates a directed graph obtained during the forming step of FIG. 4.

An example of such a directed graph is illustrated in FIG. 5. In this example, the set of profiles illustrated in Table 3 is represented in the form of a directed graph, such that a first node is connected to a second node by an arc, the arc in question having the first node for its origin and the second node for its end point, if and only if the ratio of the video bitrate of the profile corresponding to the first node and the video bitrate of the profile corresponding to the second node is greater than or equal to 1.6, which is therefore the minimum video bitrate ratio, and is less than or equal to 2.9, which is therefore the maximum video bitrate threshold. For example, an arc connects the node corresponding to profile $P_3$ to the node corresponding to profile $P_7$. In fact, the video bitrate of profile $P_3$ is 1512 kbps while the video bitrate of profile $P_7$ is 552 kbps, a ratio of approximately 2.74. Conversely, no arc connects the node corresponding to profile $P_2$, having a video bitrate of 2258 kbps, to the node corresponding to profile $P_{10}$, having a video bitrate of 488 kbps, the ratio being approximately equal to 4.63.

In one or more embodiments, the minimum video bitrate threshold is typically about 1.5 and the maximum video bitrate threshold is about 2.

In a step S42, the selection module 5 selects one or more paths of the constructed directed graph such that each path comprises a node of zero outdegree. In other words, the chosen path or paths are such that they comprise a node without successor, meaning a node that is not the origin of any arc. For example, still referring to the directed graph illustrated in FIG. 5, path $P_1$-$P_3$-$P_6$ cannot be selected. None of the nodes in this path is of zero outdegree:

$$d^+(P_1)=3 \ d^+(P_3)=2 \ d^+(P_6)=1$$

where: $d^+(P_i)$ is the outdegree of the node corresponding to profile $P_i$.

Conversely, path $P_2$-$P_4$-$P_9$ is selected by the selection module 5. The node corresponding to profile $P_9$ is of zero outdegree:

$$d^+(P_2)=2 \ d^+(P_4)=3 \ d^+(P_9)=0$$

Finally, during a step S43, the selection module 5 forms one or more ordered groups of profiles, each group corresponding to a selected path, such that a profile and its successor respectively correspond to a first node and a second node which are connected by an arc.

The fifth step S5, the selection of at least one group of profiles by the selection module 5, may also be implemented using the directed graph constructed in the embodiment described with reference to FIGS. 4 and 5.

Figure 6A:
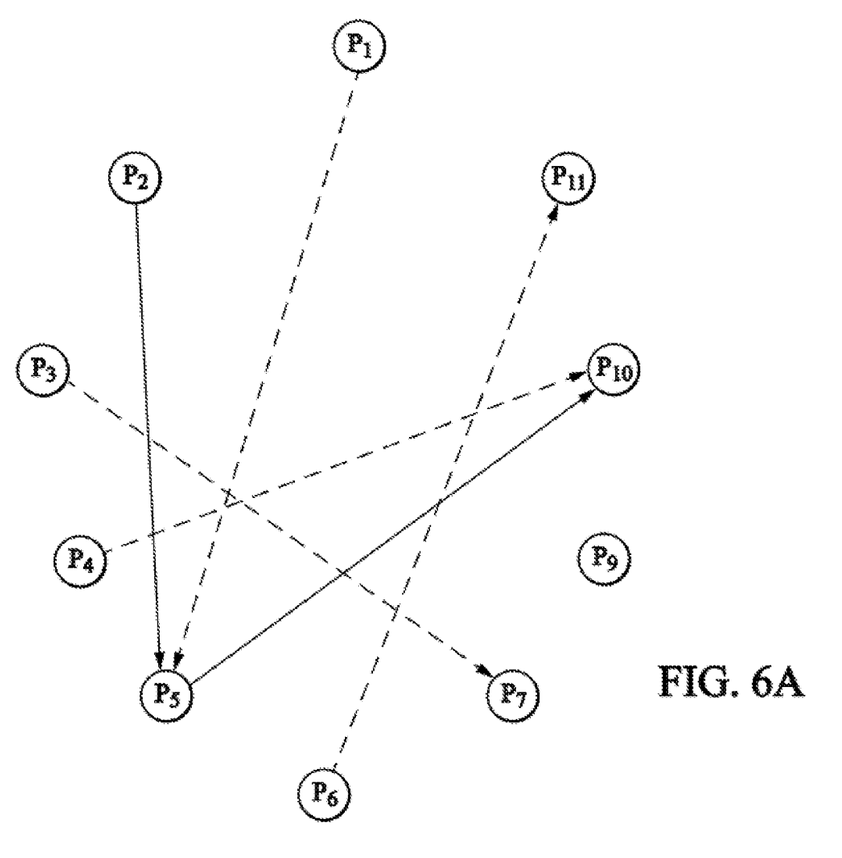
FIGS. 6A and 6B illustrate a step of selecting at least one group of profiles in the method of FIG. 3, using the directed graph illustrated in FIG. 5.

In one or more embodiments, the satisfying of the second predetermined condition by a group of profiles at least implies that the group of profiles in question makes it possible to minimize a total parameter value of the profiles of this group of profiles. For example, each profile is characterized by at least one video bitrate, and the satisfying of the second predetermined condition by a group of profiles at least implies that the group of profiles in question makes it possible to minimize a total video bitrate of the profiles of the group of profiles. An exemplary implementation of step S5 according to this second predetermined condition is illustrated in FIG. 6A.

In this directed graph, for any node of outdegree strictly greater than 1, in other words each node that is the origin of at least two arcs, only the arc leading to the profile of minimum video bitrate has been preserved. For example, with reference to FIG. 5, the node corresponding to profile $P_1$ is the origin of three arcs leading to nodes respectively corresponding to profiles $P_3$, $P_4$ and $P_5$. The respective video bitrates of profiles $P_3$, $P_4$ and $P_5$ are 1512 kbps, 1123 kbps, and 1063 kbps. The only arc originating from the node corresponding to profile $P_1$ that is retained in the directed graph illustrated in FIG. 6A is therefore the arc whose end point is the node corresponding to profile $P_5$.

The following groups are thus obtained by identifying the different possible paths:

TABLE 5

| Groups of profiles | Ordered profiles |
|---|---|
| $G_4$ | $P_1$, $P_5$, $P_{10}$ |
| $G_5$ | $P_2$, $P_5$, $P_{10}$ |
| $G_6$ | $P_3$, $P_7$ |
| $G_7$ | $P_4$, $P_{10}$ |
| $G_8$ | $P_5$, $P_{10}$ |
| $G_9$ | $P_6$, $P_{11}$ |
| $G_{10}$ | $P_7$ |
| $G_{11}$ | $P_9$ |
| $G_{12}$ | $P_{10}$ |
| $G_{13}$ | $P_{11}$ |

If, in addition, the satisfying of the second predetermined condition by a group of profiles implies that the group of profiles in question comprises at least one profile characterized by a resolution greater than or equal to a predetermined minimum resolution, for example a resolution of 1920*1080, only groups $G_4$ and $G_5$ are able to be selected. However, since groups $G_4$ and $G_5$ differ by only one profile, $P_1$ for group $G_4$ and $P_2$ for group $G_5$, group $G_5$ is preferentially selected since the video bitrate of profile $P_2$, namely 2258 kbps, is lower than the video bitrate of profile $P_1$, namely 2955 kbps. In FIG. 6A, the path corresponding to the selected group $G_5$ is drawn as a solid line, while the paths corresponding to the other groups are drawn as dotted lines.

In another embodiment, it is possible for the second predetermined condition to further concern a number of profiles comprised in the group or groups of profiles to be selected, such that the group or groups of profiles must for example have exactly two profiles. In the case described here, the groups selected by the selection module 5 are therefore groups $G_6$, $G_7$, $G_8$ and $G_9$.

Alternatively or in parallel, the satisfying of the second predetermined condition by a group of profiles implies that the group of profiles in question makes it possible to minimize a total distortion of the profiles of the group of profiles. An exemplary implementation of step S5 according to this second predetermined condition is illustrated in FIG. 6B.

Indeed, as explained above, it is quite possible that the second predetermined condition corresponds to the satisfying, by a group of profiles, of several criteria taken in combination. This combination of criteria and conditions allows for a more refined selection of the group or groups of profiles.

Figure 6B:
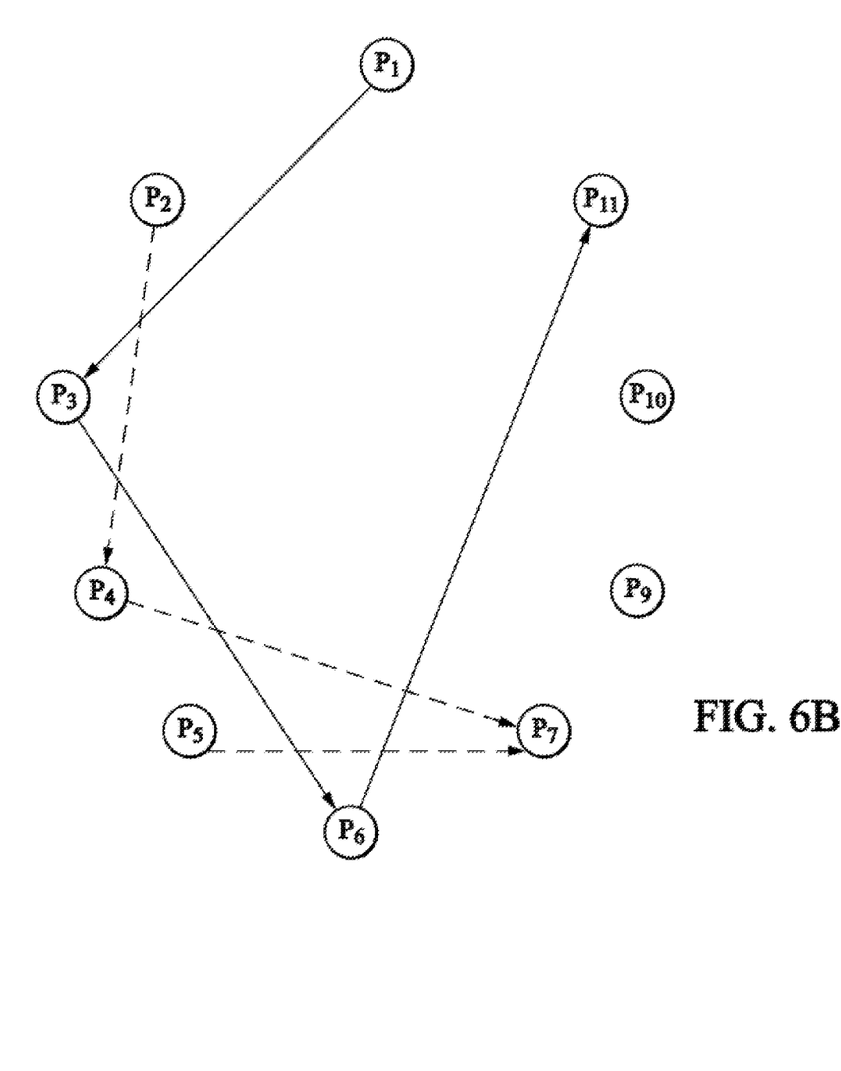

In this directed graph illustrated in FIG. 6B, for any node of outdegree strictly greater than 1, in other words each node that is the origin of at least two arcs, only the arc leading to the profile of minimum distortion has been preserved.

For example, with reference to FIG. 5, the node corresponding to profile $P_5$ is the origin of two arcs leading to the nodes respectively corresponding to profiles $P_7$ and $P_9$. The respective distortions of profiles $P_7$ and $P_9$ are 75 dB and 79 dB. The only arc originating from the node corresponding to profile $P_5$ that is retained in the directed graph in FIG. 6B is therefore the arc whose end point is the node corresponding to profile $P_7$.

The following groups are thus obtained:

TABLE 6

| Groups of profiles | Ordered profiles |
| --- | --- |
| $G_{14}$ | $P_1$, $P_3$, $P_6$, $P_{11}$ |
| $G_{15}$ | $P_2$, $P_4$, $P_7$ |
| $G_{16}$ | $P_3$, $P_6$, $P_{11}$ |
| $G_{17}$ | $P_4$, $P_7$ |
| $G_{18}$ | $P_5$, $P_7$ |
| $G_{19}$ | $P_6$, $P_{11}$ |
| $G_{20}$ | $P_7$ |
| $G_{21}$ | $P_9$ |
| $G_{22}$ | $P_{10}$ |
| $G_{23}$ | $P_{11}$ |

If, in addition, the satisfying of the second predetermined condition by a group of profiles implies that the group of profiles in question comprises at least one profile characterized by a resolution greater than or equal to a predetermined minimum resolution, for example a resolution of 1920*1080, only groups $G_{14}$ and $G_{15}$ are able to be selected. However, since the highest resolution profile of $G_{14}$, namely $P_1$, has a distortion of 24 dB lower than the distortion of the highest resolution profile of $G_{15}$, namely $P_2$ whose distortion is 32 dB, group $G_{14}$ is preferentially selected by the selection module 5. In FIG. 6A, the path corresponding to the selected group $G_{14}$ is drawn as a solid line, while the paths corresponding to the other groups are drawn as dotted lines.

In another embodiment, it is possible for the second predetermined condition to further concern a number of profiles comprised in the group or groups of profiles to be selected, such that the group or groups of profiles must for example have exactly three profiles. In the case described here, the groups selected by the selection module 5 are therefore groups $G_{15}$ and $G_{16}$.

In the description, the second predetermined condition has been presented as being applied after the first predetermined condition, since the first predetermined condition makes it possible to form one or more groups of profiles while the second predetermined condition makes it possible to select at least one group of profiles among the formed groups. However, a person skilled in the art will note that in certain cases, the first and second predetermined conditions can be applied jointly or in parallel. For example, when the second predetermined condition provides that a selected profile must comprise a profile characterized by a resolution greater than or equal to a maximum resolution, it is obvious that this condition can apply to the formation of profiles by immediately excluding groups of profiles that do not comprise a profile characterized by such a resolution.

The present disclosure has several advantages.

Firstly, the method for selecting at least one group of profiles and the encoding of the multimedia content according to each of the profiles enables an almost imperceptible transition from one profile to another during the distribution of multimedia content. This smoother transition is achieved by the predetermined condition satisfied by a profile and its immediate successor in the group of profiles. For example, when the video bitrate ratio between a profile and its successor is between a minimum video bitrate ratio threshold and a maximum video bitrate ratio threshold, the transition from one profile to another will be less visible when playing multimedia content.

In addition, the described method makes it possible to avoid storing too many versions of the same multimedia content while offering customers a diversity of profiles adapted for the possible variations in conditions when downloading or playing the multimedia content, as well as hardware constraints.

Finally, the ability to select a group comprising a profile with a resolution greater than or equal to a minimum resolution also ensures that the client has the ability to access the best possible quality for playing the multimedia content. Moreover, minimizing the total distortion of the selected group or groups of profiles also makes it possible to optimize the quality offered to the clients.

The invention claimed is:

1. A method, implemented by computer means, for digitally encoding a multimedia content into one or more video streams for on-demand distribution to at least one receiving terminal, the method comprising:

from a given set of profiles, each profile being characterized by a value of at least one encoding parameter, forming a plurality of ordered groups of profiles, the same profile being able to be present in multiple groups, such that in each group, each profile and its immediate successor satisfy a first predetermined condition, and selecting from the formed groups at least one group of profiles satisfying a second predetermined condition, encoding the multimedia content into one or more video streams, each video stream being obtained by encoding said multimedia content according to a profile from the at least one selected group of profiles, wherein forming the plurality of ordered groups of profiles comprises:

constructing a directed graph comprising a set of nodes and a set of arcs such that each node corresponds to a profile in the set of profiles, and such that a first node is connected to a second node by an arc, said arc having said first node as its origin and said second node as its end point, if and only if the profiles respectively associated with said first and second nodes satisfy the first predetermined condition, selecting one or more paths of said directed graph such that each path comprises a node of zero outdegree, and forming the plurality of ordered groups of profiles, each group corresponding to a selected path, such that a profile and its successor respectively correspond to a first node and a second node connected by an arc.

2. The method of claim 1, wherein the first predetermined condition relates to a continuity between each profile and its immediate successor, said continuity concerning respective encoding parameter values of said profile and said immediate successor.

3. The method of claim 1, wherein forming the plurality of groups of profiles is implemented such that, in each formed group of profiles, each profile has a predecessor and a successor except in a case of impossibility related to the first predetermined condition.

4. The method of claim 1, wherein a profile is characterized by two encoding parameter values: a resolution and a video bitrate.

5. The method of claim 4, wherein a distortion value is associated with each pair of values for the resolution and video bitrate, said distortion being representative of a video quality obtained after encoding the multimedia content according to the profile characterized by said values for the resolution and video bitrate into a video stream and decoding said video stream.

6. The method of claim 5, wherein forming the plurality of ordered groups of profiles is preceded by filtering comprising:

ordering the profiles of the set of profiles by descending order of resolution, such that if the plurality of profiles have the same resolution, these profiles are ordered by descending order of bitrate or by increasing order of distortion, and if, after ordering, a first profile precedes a second profile such that the second profile has a video bitrate higher than the first profile or a distortion lower than the first profile, deleting said second profile from the set of profiles.

7. The method of claim 5, wherein the satisfying of the first predetermined condition by a profile and its immediate successor in a group of profiles at least implies that the resolution of said successor is less than or equal to the resolution of said profile, that the video bitrate of said successor is less than or equal to the video bitrate of said profile, and that the distortion of said successor is greater than or equal to the distortion of said profile.

8. The method of claim 1, wherein each profile is characterized at least by a video bitrate, and the satisfying of the first predetermined condition by a profile and its immediate successor in a group of profiles at least implies that the ratio of the video bitrate of said profile and of the video bitrate ratio of said successor is greater than or equal to a minimum video bitrate ratio threshold and is less than or equal to a maximum video bitrate threshold.

9. The method of claim 1, wherein a video quality obtained after encoding the multimedia content into a video stream according to a given profile and decoding said video stream is characterized by a distortion, and the satisfying of the first predetermined condition by a profile and its immediate successor in a group of profiles at least implies that the ratio of the distortion of said profile and the distortion of said successor is greater than or equal to a minimum distortion ratio threshold and is less than or equal to a maximum distortion ratio threshold.

10. The method of claim 1, wherein the satisfying of the second predetermined condition by a group of profiles at least implies that said group of profiles comprises at least one profile characterized by a parameter value satisfying a threshold constraint on said parameter.

11. The method of claim 10, wherein:

the at least one profile is characterized by a resolution, and the satisfying of the threshold constraint by said at least one profile implies that said resolution of the at least one profile is greater than or equal to a predetermined minimum resolution, or the at least one profile is characterized by a resolution, and the satisfying of the threshold constraint by said at least one profile implies that said resolution of the at least one profile is less than or equal to a predetermined maximum resolution, or the at least one profile is characterized by a video bitrate, and the satisfying of the threshold constraint by said at least one profile implies that said video bitrate of the at least one profile is greater than or equal to a predetermined minimum bitrate, or the at least one profile is characterized by a video bitrate, and the satisfying of the threshold constraint by said at least one profile implies that said video bitrate of the at least one profile is less than or equal to a predetermined maximum bitrate.

12. The method of claim 1, wherein the satisfying of the second predetermined condition by a group of profiles at least implies that said group of profiles makes it possible to minimize a total parameter value of the profiles of said group of profiles.

13. The method of claim 12, wherein the total parameter value to be minimized is a video bitrate.

14. The method of claim 1, wherein a video quality obtained after encoding the multimedia content into a video stream according to a given profile and decoding said video stream is characterized by a distortion, and the satisfying of the second predetermined condition by a group of profiles at least implies that said group of profiles makes it possible to minimize a total distortion of the profiles of said group of profiles.

15. The method of claim 1, wherein the second predetermined condition relates at least to a number of profiles comprised in the at least one group of profiles to be selected.

16. The method of claim 1, wherein forming the plurality of groups of profiles is preceded by:

analyzing a video quality obtained after encoding the multimedia content into a video stream and then decoding said video stream, these encoding and decoding operations being repeated for different values of at least one encoding parameter, and generating a set of profiles according to the video quality analysis, each profile being characterized by a value of the at least one encoding parameter.

17. A non-transitory computer-readable medium storing a computer program comprising instructions for implementing the method according to claim 1, when said instructions are executed by at least one processor.

18. A system, comprising a device for selecting at least one group of profiles for encoding a multimedia content, each profile being characterized by a value of at least one encoding parameter, in order to digitally encode said multimedia content into one or more video streams for on-demand distribution to at least one receiving terminal, said selection device being arranged to form, from a given set of profiles, a plurality of ordered groups of profiles, it being possible for a same profile to be present in multiple groups, such that in each group, each profile and its immediate successor satisfy a first predetermined condition, said selection device being further arranged to select from the formed groups at least one group of profiles satisfying a second predetermined condition, wherein forming the plurality of ordered groups of profiles comprises:

constructing a directed graph comprising a set of nodes and a set of arcs such that each node corresponds to a profile in the set of profiles, and such that a first node is connected to a second node by an arc, said arc having said first node as its origin and said second node as its end point, if and only if the profiles respectively associated with said first and second nodes satisfy the first predetermined condition, selecting one or more paths of said directed graph such that each path comprises a node of zero outdegree, and forming the plurality of ordered groups of profiles, each group corresponding to a selected path, such that a profile and its successor respectively correspond to a first node and a second node connected by an arc.

19. The system of claim 18, further comprising an analysis device arranged to analyze a video quality obtained after encoding the multimedia content into a video stream and then decoding said video stream, these encoding and decoding operations being repeated for different values of at least one encoding parameter, said analysis device being further arranged to generate a set of profiles, each profile being characterized by a value of the at least one encoding parameter.

20. The system of claim 18, further comprising an encoding device arranged to encode the multimedia content into one or more video streams, each video stream being obtained by encoding said multimedia content according to a profile from the at least one group of profiles that is selected by the selection device.

* * * * *